H. BRINCK.
DEVICE FOR FILTERING AND PURIFYING WATER.
APPLICATION FILED JULY 5, 1917.
1,279,240. Patented Sept. 17, 1918.
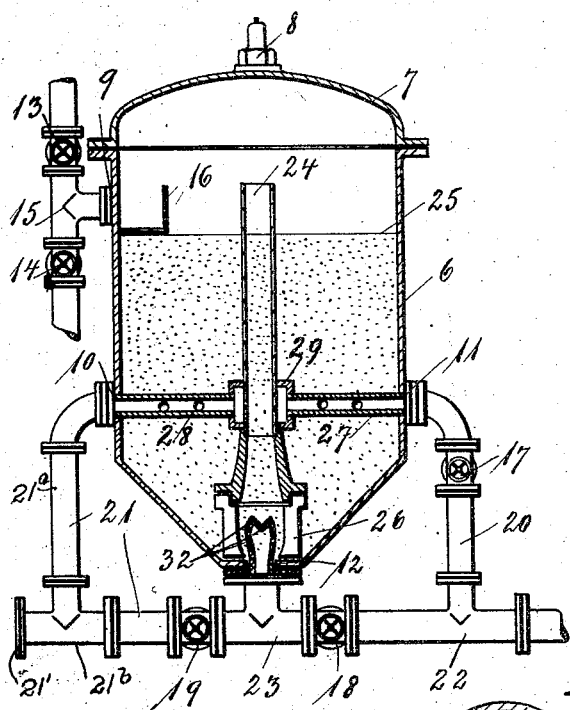
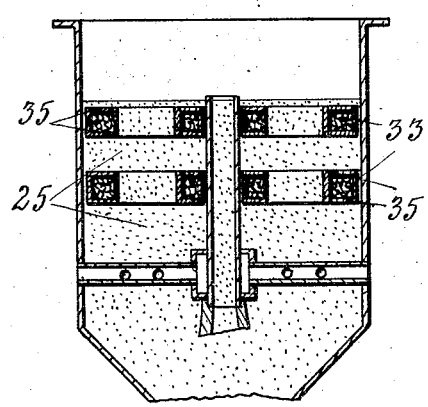
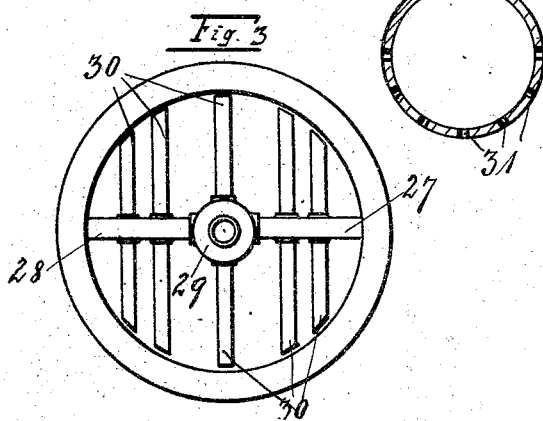
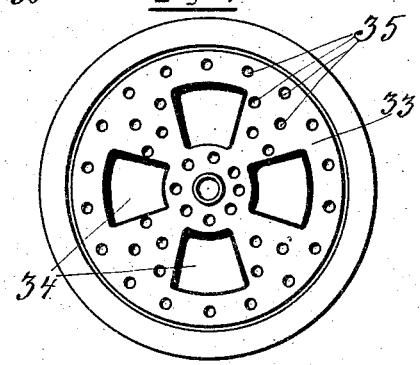
WITNESSES:
INVENTOR
BY
ATTORNEY

UNITED STATES PATENT OFFICE.

HANS BRINCK, OF LOS ANGELES, CALIFORNIA, ASSIGNOR OF ONE-HALF TO OTTO H. KRUEGER, OF LOS ANGELES, CALIFORNIA, AND ONE-HALF TO MRS. MARY E. CLINE, OF SAN FRANCISCO, CALIFORNIA.

DEVICE FOR FILTERING AND PURIFYING WATER.

1,279,240.      Specification of Letters Patent.      Patented Sept. 17, 1918.

Application filed July 5, 1917. Serial No. 178,721.

*To all whom it may concern:*

Be it known that I, HANS BRINCK, a subject of the Emperor of Germany, residing at Los Angeles, in the county of Los Angeles and State of California, have invented new and useful Improvements in Devices for Filtering and Purifying Water, of which the following is a specification.

My invention relates to devices for filtering and purifying water, and more particularly to devices for filtration under pressure.

The object of this invention is to procure a quick filtration.

Another object is to procure a quick filtration under pressure.

Another object is to provide a filter which can be cleaned by reversing the circulation in such a manner as to allow the filtration in the moment the circulation is again conducted in the normal direction.

Another object is to provide a filter in which the filtering settles to the normal level after the reversing of the circulation for the purpose of cleaning the filter so as to withstand the full pressure of the regular circulation as soon as the circulation is again conducted in the normal direction.

The invention consists in the construction, combination and arrangement of devices hereafter more fully described and claimed, and illustrated in the accompanying drawing, in which—

Figure 1 is a vertical sectional view of my device.

Fig. 2 is a fragmentary vertical sectional view of my device with extra filtering layers inserted.

Fig. 3 is the top view of the filter tubes in my device.

Fig. 4 is the top view of one of the extra filtering layers in my device.

Fig. 5 is a vertical cross section through one of the filter tubes.

Similar numbers refer to similar parts throughout the several views.

In Fig. 1, 6 designates the filter basin, 7 the cover, 8 an air escape valve, 9 the water inlet opening, and 10, 11 and 12 water outlet openings. A water inlet valve 13 and a waste outlet valve 14 are connected to the filter basin by a suitable fitting 15. A baffle plate or box 16 is provided inside of the filter basin in front of the inlet opening 9 to prevent the water from disturbing the filtering. The valves 17, 18, and 19 are inserted in the pipe connections 20, 21, 22 and 23 of which the purposes will be described later on. The branch pipe 21$^a$ is connected to the line pipe 21 by a T and the outer end of the T 21$^b$ is closed by a cap 21'. The drawing is made from one of a battery of filters connected to one supply line. When only one filter is to be set an L may be substituted for the T 21$^b$. The pipes 20 and 21$^a$, 21$^b$ and 21 serve to feed the conduits 27 and 28 from both ends. A standpipe 24 is disposed in the basin terminating with its upper end at a suitable point above the filtering medium 25 and being mounted with its lower end on a suitable number of standards 26 so as to allow freely communication between the standard pipe and the basin on both ends of the standard pipe. Conduits 27 and 28 are communicating with the outlet openings 10 and 11 terminating toward the center of the basin in a communicating chamber 29. The communicating chamber 29 is mounted on the standard pipe surrounding the pipe being shut off from communication with the standard pipe and the basin except through the conduits. The conduits are provided with a suitable number of filter tubes 30, see Fig. 3. The filter tubes are provided with fine slots 31 more clearly shown in the enlarged sectional view of Fig. 5. A cleaning and filter separator 32 is disposed above the outlet opening 12.

In operating the filter, the inlet valve 13 is opened while the waste outlet valve 14 is closed, the three valves 17, 18 and 19 are also open. The filtration occurs then from the inlet opening 9 through the filtering medium 25, partly through the separator 32 and the rest through the fine slots in the filter tubes 30, through the communicating chamber 29 and through the pipes 20 and 21 joining with the stream out of the fitting 23 into the outlet tube 22, which leads to a reservoir for the filtered water not shown in the drawing.

In Fig. 2 is a slight modification illustrated of the construction shown in Fig. 1. A suitable number of containers 33 are provided to be disposed at suitable places within the filtering medium 25 having large communicating openings 34 for the main filtering medium 25 and small communicating openings 35 for allowing the liquid to pass through the filtering within the containers which may be of charcoal and other similar mediums, while the filtering medium in the main basin of the filter may consist of sand or gravel.

When the filtering material is to be cleaned, water, either purified or raw (preferably the former), is admitted through the outlet pipe 22 and forced up through the sand, agitating this thoroughly and washing out the collected sediment through the waste pipe and valve 14. While washing, the valves 17, 19 and 13 are shut off so as to force the water through valve 18, farther through the filter separator 32, mainly through the standpipe 24 as this standpipe is mounted close above the separator and because the lower end of the standpipe is provided with an enlarged opening forming a forceful jet from the separator through the standpipe. This forcing of the water through the standpipe causes a circulation of the water through the standpipe upwardly and then back through the filtering medium downwardly past the separator again through the standpipe. The light substances and collected sediments pass easily out of the waste pipe with the water while the sand and heavy gravel settles back down in the filter basin. The settling sand and gravel is then always sucked again and again past the separator by the jet forced through the standpipe. This washing is continued until the effluent runs clear.

During the washing, the filtering medium naturally settles down in the basin in a somewhat conical form from the standpipe down toward the sides of the basin, and near the sides of the basin the layer of the sand would naturally be rather thin so that unclean water might pass through the slots 31 in the filter tubes 30 out of the filter without being thoroughly filtered when the filtration should be renewed after the washing. To prevent such breaking through of unclean water, the valve 18 is closed and valve 17 opened so as to force an even stream of water through all filter tubes upwardly through the sand filtering medium, agitating the sand evenly and thereby allowing the sand to settle in an even level mass. This settling of the filtering medium is done when the filtering material appears to be clear from the effluent running out clear, when the water is again admitted from the top and filtering renewed by closing the valve 14 and opening the valves 13, 18 and 19.

Having thus described my invention, I claim:

1. In a filter of the class described in combination with a basin having an inlet opening near the upper end and an outlet opening in the bottom, a standpipe disposed in the basin above the outlet opening spaced from the bottom so as to allow the liquid passing through the filter to pass out of the filter below the standpipe as well as through the standpipe and out of the outlet opening when normally operated as a filter and also disposed to cause the liquid to pass through the standpipe upwardly when reversed for cleaning the filter, all substantially as described.

2. A filter comprising a basin, a cover for the basin, an air valve in the cover, a water inlet and a waste outlet communicating with the top of the basin, a baffle plate in the basin in front of the inlet opening, valves for the inlet and waste outlet, a clear water outlet pipe leading from the bottom of the basin, a valve in this outlet, a standpipe mounted upon legs in the filter basin and extending upwardly from the lower outlet, perforated filter pipes mounted horizontally in the filter and connecting to a chamber around the standpipe, a branch pipe leading from the filter pipes to the clear water outlet pipe, and a valve in the branch pipe.

3. A closed filter basin, a water supply pipe leading into the top of the filter basin, a waste pipe leading from the top of the filter basin, valves in the supply pipe and in the waste pipe, a clear water drain pipe leading from the bottom of the filter basin, a standpipe in the filter basin and extending upwardly from the outlet to the drain pipe and spaced therefrom, perforated filter pipes mounted horizontally in the basin and connected to a chamber around the standpipe some distance above the bottom, a branch outlet pipe leading from the perforated pipes through the basin to the clear water drain pipe, a valve in the drain pipe, and a valve in the branch pipe.

4. A filter of the class described comprising a cylindrical basin having a hopper shaped bottom, an inlet opening near the upper end, and a suitable number of outlet openings near the lower end in the cylindrical sides of the basin, and one outlet opening in the center of the hopper shaped bottom; an inlet pipe connected to the inlet opening and provided with an inlet valve and a cleaning valve; an outlet pipe having connections for the several outlet openings in the sides as well as in the bottom of the basin and provided with a suitable number of valves; filter pipes disposed cross-wise within the filter connected to the outlet openings in the sides of the filter; a standpipe enlarged at the lower end disposed concentrically within the basin with the enlarged lower end spaced from the lowest portion of the hopper shaped bottom; and a separator disposed between the standpipe and the outlet connection in the center of the hopper shaped bottom.

In testimony whereof I hereunto affix my signature in the presence of two witnesses.

HANS BRINCK.

Witnesses:
  OTTO H. KRUEGER,
  C. MITSCHLER.